J. E. KIEFER.
MACHINE FOR MOLDING PERFORATED BRICKS OR BUILDING BLOCKS.
APPLICATION FILED NOV. 19, 1917.
1,300,734.
Patented Apr. 15, 1919.
2 SHEETS—SHEET 1.
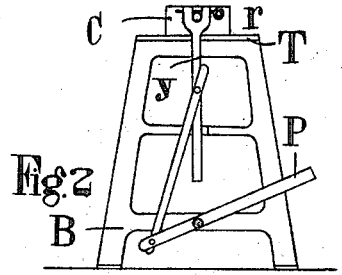
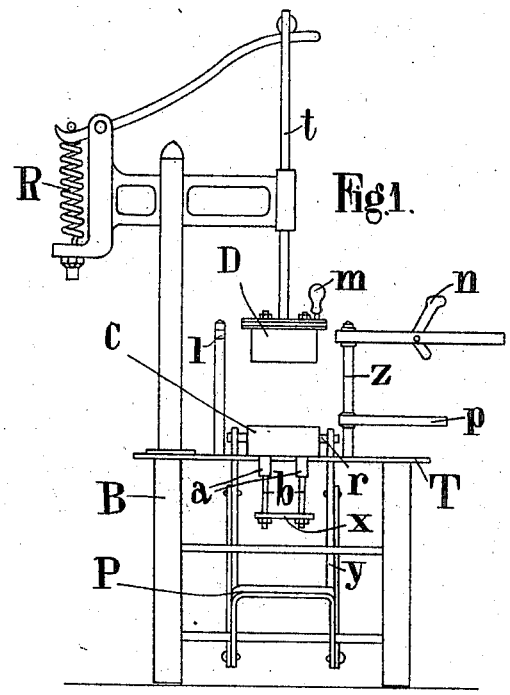
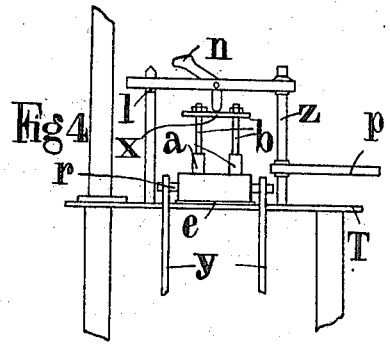
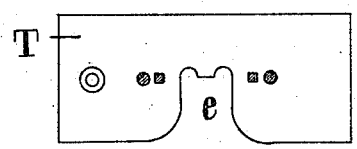
INVENTOR
J. E. Kiefer.
BY
ATTORNEY

UNITED STATES PATENT OFFICE.

JEAN E. KIEFER, OF LAUSANNE, SWITZERLAND.

MACHINE FOR MOLDING PERFORATED BRICKS OR BUILDING-BLOCKS.

1,300,734. Specification of Letters Patent. Patented Apr. 15, 1919.

Application filed November 19, 1917. Serial No. 202,696.

*To all whom it may concern:*

Be it known that I, JEAN ERNEST KIEFER, a citizen of the Swiss Republic, residing at 13 Avenue de la Harpe, Lausanne, Switzerland, have invented certain new and useful Improvements in Machines for Molding Perforated Bricks or Building-Blocks, of which the following is a specification.

This invention has for its object to provide an improved machine for molding perforated bricks or building blocks. The improved machine does not require perforated drying supports which may be of any kind.

An embodiment of this invention is illustrated in the accompanying drawings in which:—

Figure 1 is a general view of the improved machine.

Fig. 2 is a side elevation of the framing of the machine, showing the details of the lifting lever for lifting out the mold brick or block, the superstructure not being shown.

Fig. 3 is a plan of the molding table.

Fig. 4 shows the molding frame at the moment of lifting out the molded block, the bolt being closed.

As shown, in the improved machine:

B is the framing of the machine.

D is a rammer with a rod $t$, a spring R and a handle $m$.

O is the lifting plate for lifting out the molded block.

The rammer D is shaped in cross section similar to the lifting plate O.

S is a box for the molding frame.

C is a molding frame with trunnions $r$ fixed to the sides of the molding frame S, the matrices $f$ being fixed to the bottom. The lifting plate O has the shape of the empty spaces, that is to say, the cross sectional shape of the block to be molded.

$b$ are rods soldered to the lifting plate O; they slide in sheaths $a$ soldered to the bottom of the molding frame. These rods are connected together by a bar $x$.

T is a molding table (Figs. 1, 2, 3, 4) cut in the shape shown in Fig. 3.

The improved machine comprises further: a system of levers adapted to be actuated by a pedal P (Fig. 2) which allows of raising the molding frame that rests with its trunnions in the forks terminating the vertical rods $y$ of the system.

$n$ is a bolt movable on a bar that is pivoted to a vertical rod Z (Figs. 1 and 4).

$p$ is a plate likewise pivoted to said rod Z on a level with the molding frame. This plate serves to even the concrete when the mold is full before proceeding to lift.

The operation of the improved machine in molding a concrete building block is as follows:—

Figure 5:
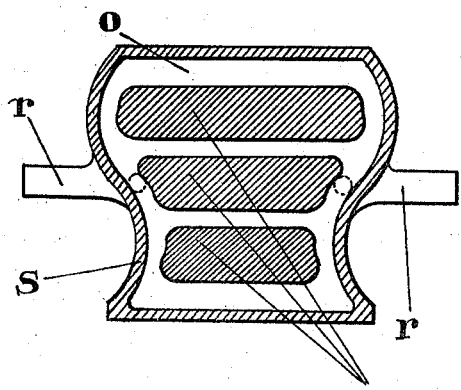
Fig. 5 is a plan of a molding frame.
Figure 6:
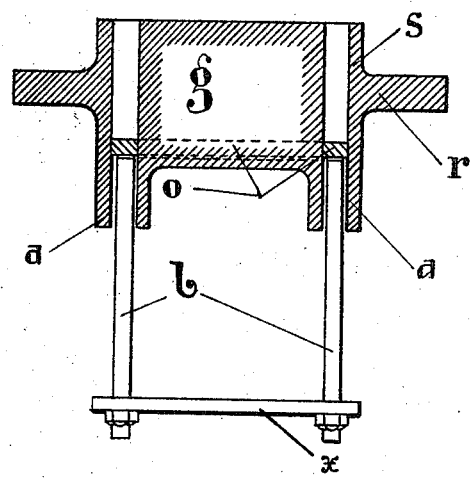
Fig. 6 is a section through the trunnions of the molding frame.
Figure 7:
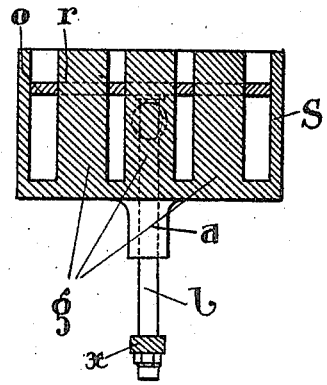
Fig. 7 is a cross section of the molding frame, the lifting plate for lifting out the molded block being shown in an intermediate position.

The molding frame C being in the position shown in Figs. 1, 2, 6, it is filled with concrete which is then rammed by the rammer D actuated by means of the handle $m$. The plate $p$ is turned, a further stroke of the ram is given, and the plate $p$ is returned into its outer position.

The operator then presses with his foot upon the pedal P in order to raise the full molding frame to the necessary height, and by gripping the bar $x$ with his hand the operator causes the molding frame to tilt over and become inverted upon the supporting plate $e$ (Fig. 4). The pedal is then released.

Then the shank of the bolt is turned which engages in the notch $l$. The bolt $n$ is lowered which then bears firmly against the bar $x$ (position shown in Fig. 4).

The pedal $p$ is operated anew. By the operation of the levers (Fig. 4) the box S of the molding frame is raised, while the plate $o$ is rendered stationary by the bar $x$ and the rods $b$. It is then merely necessary to remove the molded brick on its support $e$.

What I claim is:—

In a machine for molding perforated bricks or building blocks, the combination with the machine frame of a molding frame fitted in the machine frame and corresponding in shape to that of the brick or block to be molded, said molding frame consisting of an outer mold box, matrices for forming the cavities in the brick or block, a molding plate having the same section as the brick or block and to correspond with that of the mold, rods fixed to said molding plate and slidable in sheaths fixed at the bottom part of said molding frame, a gripping bar attached to the lower ends of said rods, a lever system pivotally connected to said molding and machine frames, a foot pedal to operate said lever system to raise the said molding frame to allow the latter to be tilted over and inverted upon a supporting plate by the gripping bar, a pressure applying bolt movably connected in the frame of said machine to press the gripping bar and thereby the molding plate upon the brick or block, substantially as described.

In testimony whereof I have signed my name to this specification.

J. E. KIEFER.

Witnesses:
 AUG. BIZOT,
 JEAN BRAZHIM.